(12) United States Patent
Chou (10) Patent No.: US 8,743,806 B2
(45) Date of Patent: Jun. 3, 2014

(54) SYSTEM AND METHOD FOR MULTICARRIER UPLINK CONTROL

(75) Inventor: Chie-Ming Chou, Cingshuei Township (TW)

(73) Assignee: Industrial Technology Research Institute, Hsinchu (TW)

( * ) Notice: Subject to any disclaimer, the term of this patent is extended or adjusted under 35 U.S.C. 154(b) by 19 days.

(21) Appl. No.: 13/251,675

(22) Filed: Oct. 3, 2011

(65) Prior Publication Data

US 2012/0026958 A1    Feb. 2, 2012

Related U.S. Application Data

(62) Division of application No. 12/401,664, filed on Mar. 11, 2009.

(60) Provisional application No. 61/071,551, filed on May 5, 2008.

(51) Int. Cl.
| | | |
|---|---|---|
| *H04W 72/04* | (2009.01) | |
| *H04W 72/08* | (2009.01) | |
| *H04L 12/56* | (2006.01) | |

(52) U.S. Cl.
CPC ......... *H04W 72/087* (2013.01); *H04L 47/805* (2013.01)
USPC ........................................................ 370/329

(58) Field of Classification Search
CPC ... H04L 5/003; H04L 5/0007; H04W 72/087; H04W 72/04
USPC ........................... 370/230, 329, 331; 455/423
See application file for complete search history.

(56) References Cited

U.S. PATENT DOCUMENTS

| | | | |
|---|---|---|---|
| 7,164,696 | B2 | 1/2007 | Sano et al. |
| 7,245,595 | B2 | 7/2007 | Kim et al. |
| 7,245,922 | B2 | 7/2007 | Furuskär et al. |
| 7,352,767 | B2 | 4/2008 | Jang |
| 7,363,039 | B2 | 4/2008 | Laroia et al. |
| 7,366,525 | B2 | 4/2008 | Drury et al. |
| 7,373,151 | B1 | 5/2008 | Ahmed |
| 7,397,859 | B2 | 7/2008 | McFarland |
| 7,403,505 | B2 | 7/2008 | Yoon et al. |
| 7,414,994 | B2 | 8/2008 | Li et al. |

(Continued)

FOREIGN PATENT DOCUMENTS

| | | |
|---|---|---|
| CN | 1473415 A | 2/2004 |
| CN | 1878391 | 12/2006 |

(Continued)

OTHER PUBLICATIONS

Cho, Jaehee, et al., "3$^{rd}$ (Final) Draft of Multi-Carrier RG Harmonized Text Proposal", IEEE 802.16 Broadband Wireless Access Working Group, Oct. 31, 2008, pp. 1-19.

(Continued)

*Primary Examiner* — Pao Sinkantarakorn
*Assistant Examiner* — Richard K Chang
(74) *Attorney, Agent, or Firm* — McClure, Qualey & Rodack, LLP (57) ABSTRACT

An uplink control method for use in a communication system based on multiple carriers. The method includes allocating different types of random access channels for different types of uplink operations.

4 Claims, 8 Drawing Sheets

(56) References Cited

U.S. PATENT DOCUMENTS

| | | | |
|---|---|---|---|
| 7,440,390 | B2 | 10/2008 | Kondo |
| 7,440,759 | B2 | 10/2008 | Kang et al. |
| 7,460,466 | B2 | 12/2008 | Lee et al. |
| 7,564,787 | B2* | 7/2009 | Briggs .................. 370/230 |
| 8,180,354 | B2 | 5/2012 | Li et al. |
| 2006/0250963 | A1* | 11/2006 | Jin et al. .................. 370/236 |
| 2007/0002958 | A1* | 1/2007 | Chang et al. ............ 375/260 |
| 2007/0086339 | A1* | 4/2007 | Briggs .................. 370/230 |
| 2007/0086368 | A1 | 4/2007 | Lee et al. |
| 2007/0115800 | A1 | 5/2007 | Fonseka et al. |
| 2007/0183308 | A1 | 8/2007 | Korobkov et al. |
| 2007/0207810 | A1 | 9/2007 | Cho et al. |
| 2007/0230376 | A1 | 10/2007 | Park et al. |
| 2007/0248046 | A1 | 10/2007 | Khan |
| 2007/0253466 | A1 | 11/2007 | Jones et al. |
| 2008/0043813 | A1 | 2/2008 | Azenkot et al. |
| 2008/0123594 | A1 | 5/2008 | Yoshizawa et al. |
| 2008/0298318 | A1* | 12/2008 | Lee et al. ............... 370/329 |
| 2008/0298450 | A1 | 12/2008 | Zhang et al. |
| 2009/0022064 | A1* | 1/2009 | Oron et al. ............. 370/253 |
| 2009/0028159 | A1* | 1/2009 | Boudreau et al. ...... 370/395.21 |

FOREIGN PATENT DOCUMENTS

| | | |
|---|---|---|
| CN | 1878391 A | 12/2006 |
| CN | 1917693 | 2/2007 |
| CN | 1917693 A | 2/2007 |
| EP | 2 173 109 | 4/2010 |
| JP | 2005-318132 | 11/2005 |
| JP | 2007-6476 | 1/2007 |
| KR | 2005-29112 | 3/2005 |
| KR | 2005-52124 | 6/2005 |
| KR | 100812353 | 3/2008 |
| WO | 0205453 A2 | 1/2002 |
| WO | WO 2004/107606 | 12/2004 |
| WO | WO 2006/029568 | 3/2006 |
| WO | WO 2006/049235 | 5/2006 |
| WO | WO 2007/139188 | 12/2007 |
| WO | WO 2007/142492 | 12/2007 |
| WO | WO 2008/026461 | 3/2008 |
| WO | WO 2008/027696 | 3/2008 |
| WO | WO 2008/069624 | 6/2008 |

OTHER PUBLICATIONS

Notification of Reasons for Refusal for Application No. 2009-107392, from the Japanese Patent Office, dated Jun. 21, 2011.
Notice to Submit Response for Application No. 10-2009-0036603, from the Korean Intellectual Property Office, dated Nov. 15, 2010.
Office Action for Application No. 200910138137.2, from the Chinese Patent Office, dated Nov. 12, 2010.
Decision of Rejection of CN application 200910138137.2 (which is a related Chinese application) dated Aug. 5, 2013.
European Search Report dated Mar. 12, 2014.
English language translation of abstract of KR 100812353 (published Mar. 11, 2008).
Chou, C.M., et al.; "Proposal for Multicarrier Uplink control Structure;" May 5, 2008; pp. 1-7.

* cited by examiner

SYSTEM AND METHOD FOR MULTICARRIER UPLINK CONTROL

RELATED APPLICATIONS

This is a divisional of application Ser. No. 12/401,664, filed Mar. 11, 2009, which This application is based upon and claims the benefit of priority from U.S. Provisional Patent Application No. 61/071,551, filed May 5, 2008, the entire contents of which are incorporated herein by reference.

FIELD OF THE INVENTION

This invention relates to systems and methods for multicarrier uplink control.

BACKGROUND OF THE INVENTION

Wireless communication systems based on a multicarrier scheme, such as orthogonal frequency-division multiplexing (OFDM) based communication systems, are gaining worldwide popularity due to their broad applications. The multicarrier scheme allows a multicarrier communication system to operate on multiple carriers including continuous and discontinuous carriers. Each of the multiple carriers corresponds to a relatively narrow frequency band, and may have a different bandwidth.

Traditionally, a separate fast Fourier transform (FFT) and radio frequency (RF) module may be used for each band, and a medium access control (MAC) module may then be used in the multicarrier communication system to support multicarrier functionalities. Based on different capabilities of different user terminals, a network side, such as a base station (BS), a Node B defined in a Universal Mobile Telecommunications System (UMTS) standard, or an access point (AP), may serve different user terminals with different bandwidths. For example, based on the multicarrier scheme, the base station may flexibly use available bandwidth resources to achieve high throughput and capacity.

For controlling and utilizing the multiple carriers, each of the multiple carriers may be classified as a primary carrier, also known as a fully configured carrier, or a secondary carrier, also known as a partially configured carrier. For example, a primary carrier is typically used to transmit both control information and data, and a secondary carrier is typically used to only transmit data. Depending on characteristics of transmission of control information and data, a downlink control method may use different downlink control structures for a primary carrier and a secondary carrier.

Figure 1:
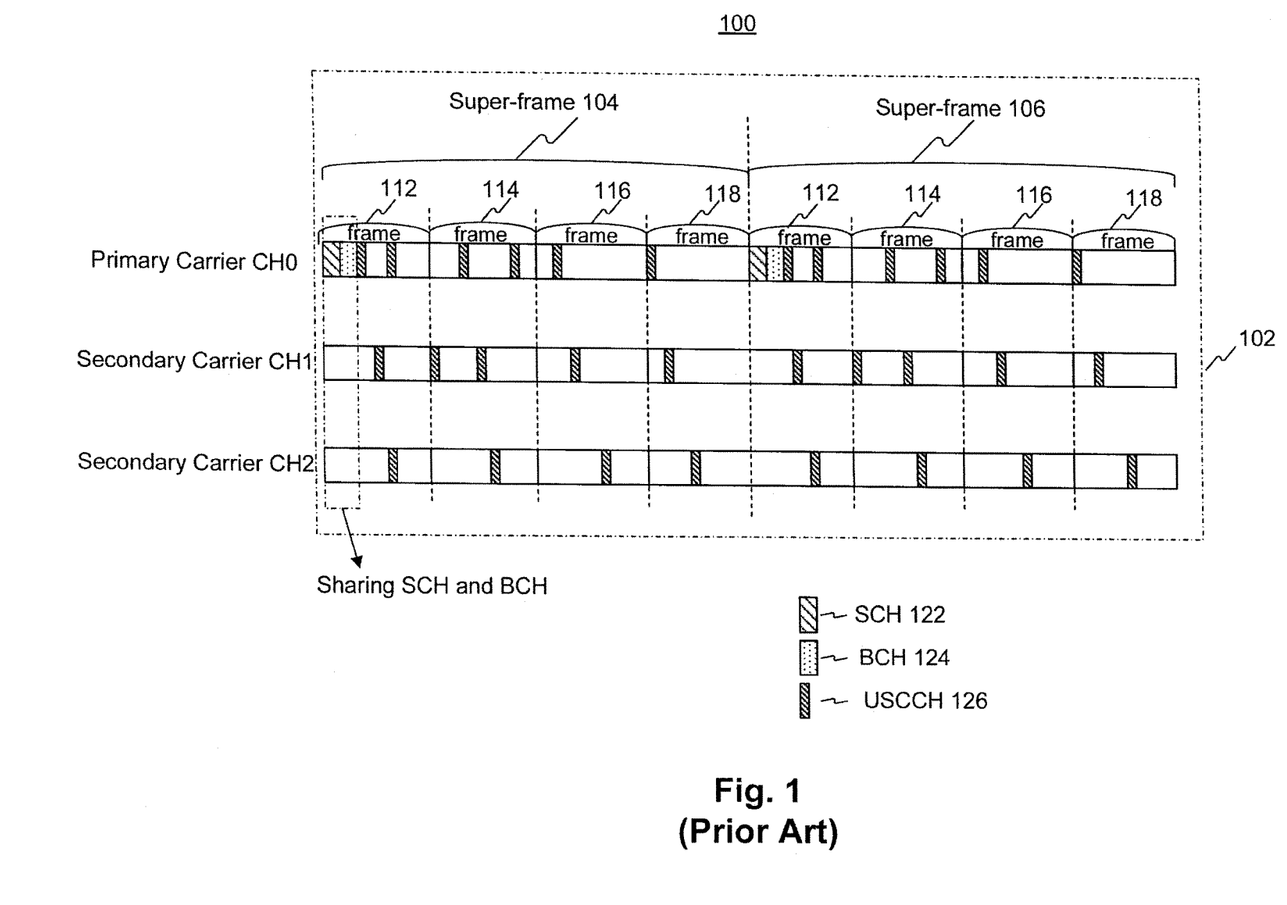
FIG. 1 illustrates a conventional downlink control method for use in a multicarrier communication system.

FIG. 1 illustrates a conventional downlink control method 100 for use in a multicarrier communication system based on IEEE standard 802.16m. For convenience of illustration, a frame structure 102 is shown for a primary carrier CH0, a first secondary carrier CH1, and a second secondary carrier CH2 of the multiple carriers of the multicarrier system. For example, the frame structure 102 may include a plurality of super-frames, such as first and second super-frames 104 and 106. Each of the plurality of super-frames may further include a plurality of frames. Based on the IEEE standard 802.16m, each of the plurality of super-frames may include four frames 112, 114, 116, and 118. Traditionally, three control channels, including a synchronization control channel (SCH) 122, a broadcast control channel (BCH) 124, and a unicast service control channel (USCCH) 126, may be used for downlink control.

For example, the SCH 122 may provide a reference signal for time, frequency, frame synchronization, and base station identification. The SCH 122 may be only allocated to the primary carrier CH0. In addition, the SCH 122 may be transmitted on the primary carrier CH0 every one or more frames, such as every four frames as shown in FIG. 1, and a location of the SCH 122 may be fixed in each of the plurality of super-frames. The secondary carriers CH1 and CH2 may share the SCH 122 with the primary channel CH0.

Also for example, the BCH 124 may provide system configuration information and broadcast information, such as neighbor base station information, paging information, etc. The BCH 124 may be only allocated to the primary carrier CH0. In addition, the BCH 124 may be transmitted on the primary carrier CH0 every one or more frames, such as every four frames as shown in FIG. 1, and a location of the BCH 124 may be fixed in each of the plurality of super-frames. The secondary carriers CH1 and CH2 may share the BCH 124 with the primary channel CH0.

Further for example, the USCCH 126 may provide resource allocation for unicast services. The USCCH 126 may be allocated to the primary carrier CH0 and the secondary carriers CH1 and CH2. In addition, the USCCH 126 and the SCH 122 are transmitted at different times, and the USCCH 126 and the BCH 124 are also transmitted at different times.

SUMMARY OF THE INVENTION

In accordance with the invention, there is provided an uplink control method for use in a communication system based on multiple carriers, the method comprising: allocating different types of random access channels for different types of uplink operations.

Also in accordance with the invention, there is provided a base station configured to: allocate different types of random access channels for different types of uplink operations.

Further in accordance with the invention, there is provided a mobile station configured to: perform different types of uplink operations on different types of random access channels.

Further in accordance with the invention, there is provided a bandwidth request method for use in a communication system based on multiple carriers, the method comprising: determining, for communication connections for which a bandwidth request is to be sent, a quality of service (QoS) of each of the communication connections; and sending the bandwidth request based on the determination.

Further in accordance with the invention, there is provided a mobile station configured to: determine, for communication connections for which a bandwidth request is to be sent, a quality of service (QoS) of each of the communication connections; and send the bandwidth request based on the determination.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In exemplary embodiments consistent with the present invention, there is provided an uplink control method for use in a wireless communication system based on multiple carriers, referred to herein as a multicarrier communication system. Each of the multiple carriers corresponds to a frequency band, and may have a different bandwidth. The multicarrier communication system may include a network side, such as a base station (BS), a Node B defined in the Universal Mobile Telecommunications System (UMTS) standard, an E-Node B defined in the 3rd Generation Partnership Project (3GPP) long term evolution (LTE) system, or an access point (AP), and one or more user terminals, such as mobile stations (MSs). The network side may wirelessly communicate with the user terminals on one or more of the multiple carriers. For illustrative purposes only, it is assumed that the multicarrier communication system is an IEEE standard 802.16m based communication system including at least one base station and one mobile station.

In exemplary embodiments consistent with the present invention, each of the multiple carriers may be a primary carrier or a secondary carrier. A primary carrier may be also referred to as a fully configured carrier, and is typically used to transmit both control information and data. A secondary carrier may be also referred to as a partially configured carrier, and is typically used to only transmit data. The multicarrier communication system may have one or more primary carriers and one or more secondary carriers.

In exemplary embodiments consistent with the present invention, there is provided an uplink control structure, based on which the mobile station may perform random access operations, e.g., uplink ranging operations, with the base station. For example, ranging may be an uplink procedure performed by the mobile station to maintain quality of communication between the mobile station and the base station. When the base station receives a ranging signal from the mobile station, the base station may process the received ranging signal to calculate various communication parameters, such as a timing offset, a frequency offset, and a power strength. Based on the calculation, the base station may indicate to the mobile station any adjustments the mobile station needs to make in order to maintain the quality of the communication, such as an adjustment in transmitting power or an adjustment in transmission timing.

In exemplary embodiments consistent with the present invention, the mobile station may perform different types of random access operations, such as initial ranging, periodic ranging, handover ranging, or bandwidth request ranging. For example, the mobile station may perform initial ranging when it performs network entry. The mobile station performs network entry at the time it is turned on. Also for example, the mobile station may perform periodic ranging because, e.g., a location of the mobile station may be changed and the mobile station needs to make adjustments in transmitting power and/or transmission timing in order to maintain communication quality. Further for example, the mobile station may perform handover ranging when it performs handover between different primary carriers, which may belong to the same base station or a different base station. As another example, the mobile station may perform bandwidth request ranging when it wants to request bandwidth resources from the base station.

In exemplary embodiments consistent with the present invention, different types of random access channels, e.g., different types of ranging channels, may be allocated for different types of ranging operations. For example, the uplink control structure may include an initial ranging channel allocated for the mobile station to perform initial ranging, a periodic ranging channel allocated for the mobile station to perform periodic ranging, a handover ranging channel allocated for the mobile station to perform handover ranging, and/or a bandwidth request ranging channel allocated for the mobile station to perform bandwidth request ranging. These ranging channels and their allocation will be described in detail below.

Figure 2:
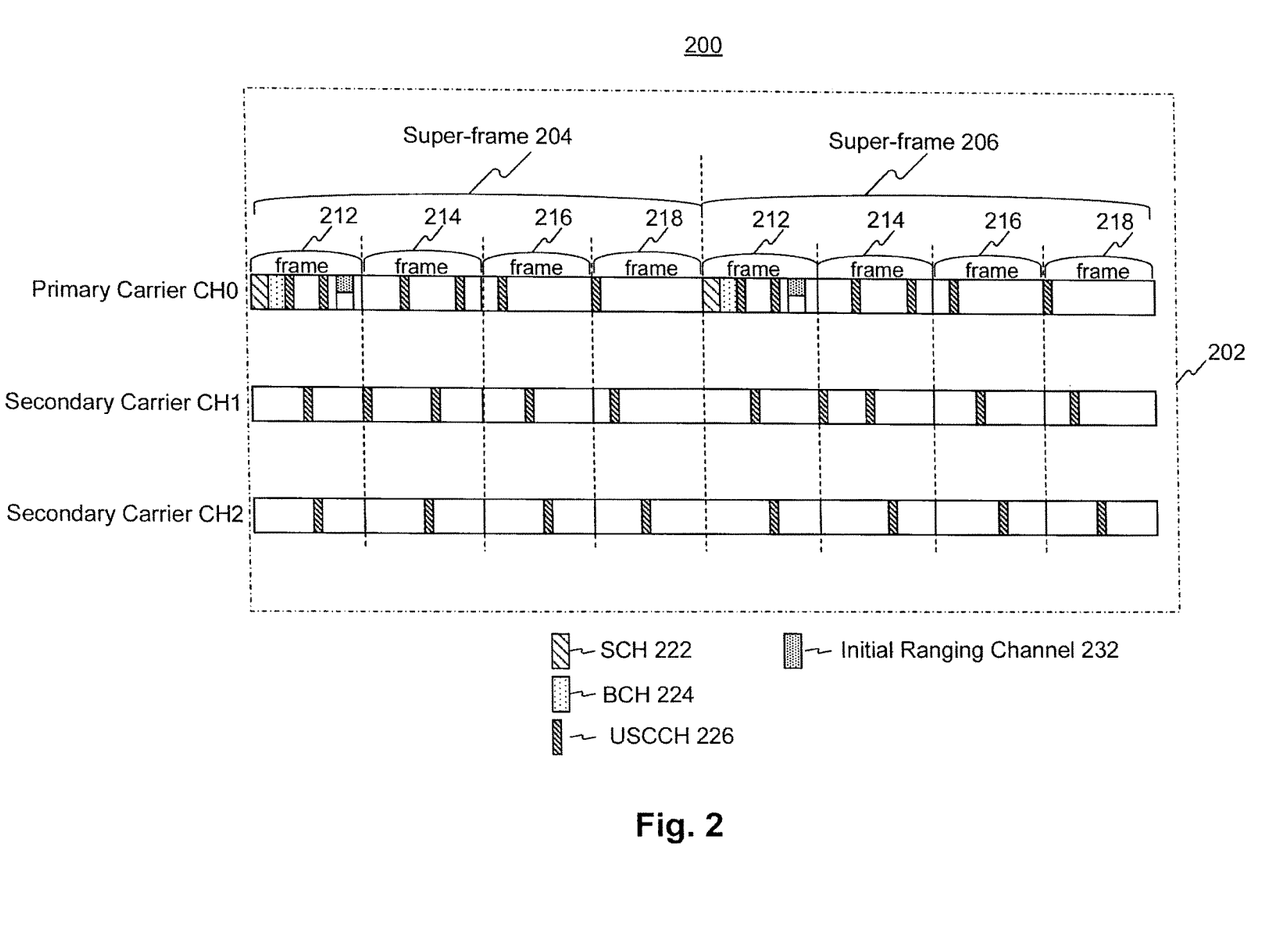
FIG. 2 illustrates an uplink control method for use in a multicarrier communication system, according to an exemplary embodiment.

FIG. 2 illustrates an uplink control method 200 for use in the above-described multicarrier communication system, according to an exemplary embodiment. For convenience of illustration, a frame structure 202 is shown for a primary carrier CH0, a first secondary carrier CH1, and a second secondary carrier CH2 of the multiple carriers. For example, the frame structure 202 may include a plurality of super-frames, such as first and second super-frames 204 and 206. Each of the plurality of super-frames may further include a plurality of frames. In the illustrated embodiment, the multicarrier communication system is an IEEE standard 802.16m based communication system. Accordingly, in the illustrated embodiment, each of the plurality of super-frames includes four frames 212, 214, 216, and 218. Each of the frames may further include a plurality of downlink and uplink sub-frames (not shown).

In addition, a synchronization control channel (SCH) 222 and a broadcast control channel (BCH) 224 may be only allocated to the primary carriers such as the primary carrier CH0, and a unicast service control channel (USCCH) 226 may be allocated to the primary and secondary carriers such as the primary carrier CH0 and the secondary carriers CH1 and CH2.

In exemplary embodiments consistent with the present invention, an initial random access channel, e.g., an initial ranging channel 232, may be only allocated to the primary carriers such as the primary carrier CH0. It is not necessary to allocate an initial ranging channel to the secondary carriers such as the secondary carrier CH1 or CH2. As a result, the mobile station may perform network entry and initial uplink synchronization on the primary carrier CH0. As noted above, the SCH 222 may be only allocated to a primary carrier. Therefore, if the mobile station, during its network entry, detects a carrier without the SCH 222, such as the secondary carrier CH1 or CH2, the mobile station may skip that carrier and proceed with scanning of frequencies, until the mobile station detects a primary carrier and determines to use the detected primary carrier to perform initial uplink synchronization, such as the primary carrier CH0. The mobile station may then perform network entry on the primary carrier CH0.

In one exemplary embodiment, the initial ranging channel 232 is transmitted on the primary carrier CH0 once in each of the plurality of super-frames. For example, the initial ranging channel 232 may be transmitted in a first uplink sub-frame in the frame 212. Furthermore, a location of the initial ranging channel 232 in a super-frame may be indicated by the BCH 224 in that super-frame. As noted above, the BCH 224 is only allocated to the primary carriers such as the primary carrier CH0. Once the mobile station detects on the primary carrier CH0 the SCH 222 in a super-frame, e.g., the super-frame 204, the mobile station may proceed with reading the BCH 224 in the super-frame 204 to obtain information regarding a location of the initial ranging channel 232 in the super-frame 204. As a result, the mobile station may perform network entry and achieve synchronization using the initial ranging channel 232 on the primary carrier CH0, and avoid initial ranging on a secondary carrier with possibly incorrect synchronization. The mobile station may still request support from additional carriers after performing network entry.

Figure 3:
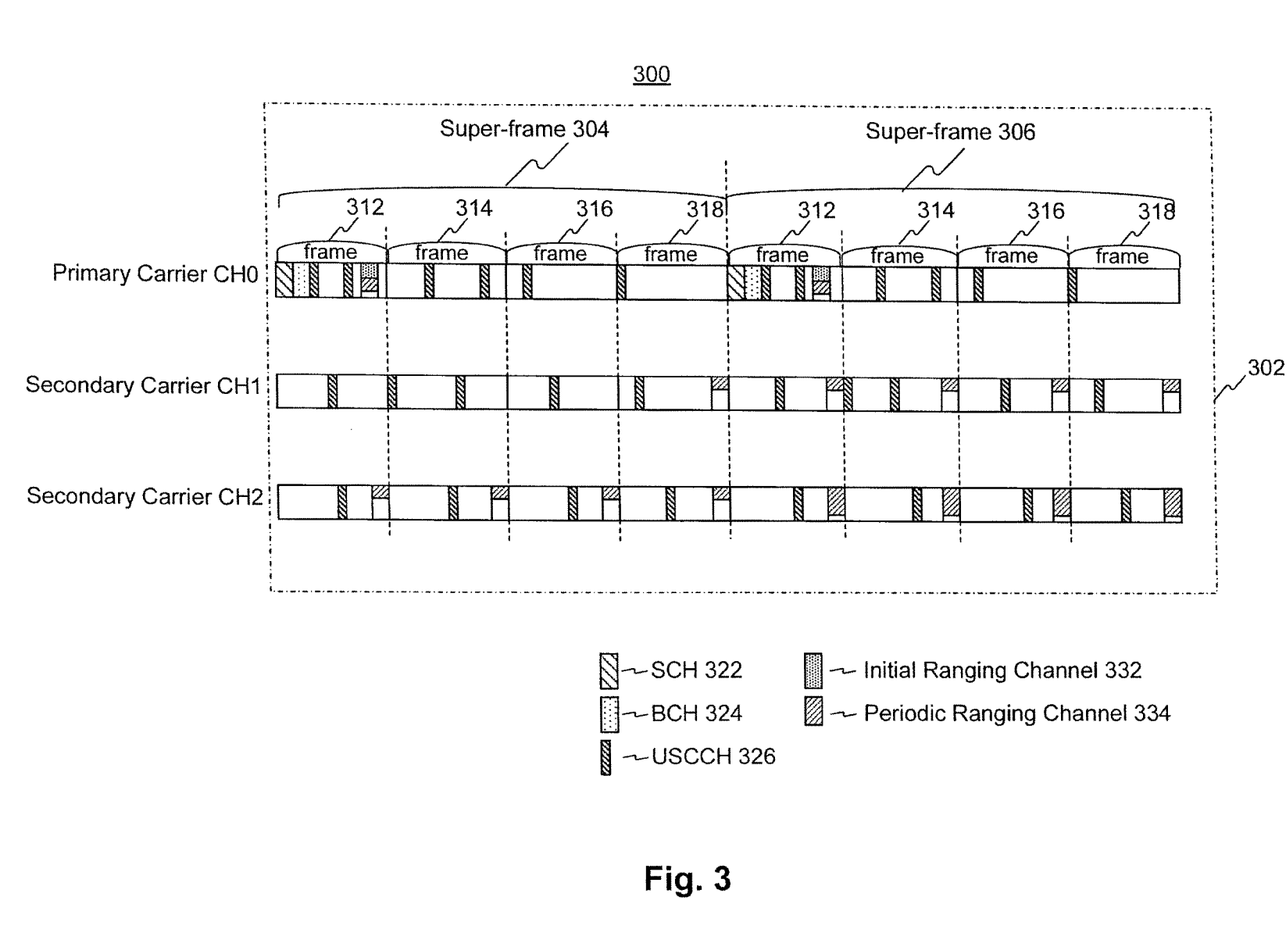
FIG. 3 illustrates an uplink control method for use in a multicarrier communication system, according to an exemplary embodiment.

FIG. 3 illustrates an uplink control method 300 for use in the above-described multicarrier communication system, according to an exemplary embodiment. For convenience of illustration, a frame structure 302 is shown for the primary carrier CH0, the first secondary carrier CH1, and the second secondary carrier CH2 of the multiple carriers. For example, the frame structure 302 may include a plurality of super-frames, such as first and second super-frames 304 and 306. Each of the plurality of super-frames may further include a plurality of frames. In the illustrated embodiment, the multicarrier communication system is an IEEE standard 802.16m based communication system. Accordingly, in the illustrated embodiment, each of the plurality of super-frames includes four frames 312, 314, 316, and 318. Each of the frames may further include a plurality of downlink and uplink sub-frames (not shown).

In addition, a synchronization control channel (SCH) 322, a broadcast control channel (BCH) 324, and an initial ranging channel 332 may be only allocated to the primary carriers such as the primary carrier CH0, and a unicast service control channel (USCCH) 326 may be allocated to the primary and secondary carriers such as the primary carrier CH0 and the secondary carriers CH1 and CH2, as described above.

In exemplary embodiments consistent with the present invention, a periodic random access channel, e.g., a periodic ranging channel 334, may be allocated to the primary carriers, such as the primary carrier CH0, and the secondary carriers, such as the secondary carriers CH1 and CH2. For example, the mobile station may switch between the primary carrier CH0 and the secondary carrier CH1 or CH2. Due to different center frequencies of carriers, the periodic ranging channel 334 may be allocated to both the primary and secondary carriers, to support the mobile station to perform periodic uplink synchronization. As a result, the mobile station may, if it is operating on the primary carrier CH0, perform periodic uplink synchronization on the primary carrier CH0, or if it is operating on the secondary carrier CH1 or CH2, perform periodic uplink synchronization on the secondary carrier CH1 or CH2.

In addition, the base station may acquire channel information from the mobile station or prepare statistics of mobile station conditions. For example, the base station may calculate a load condition for the mobile station. Accordingly, based on the load condition, the base station may re-configure allocation of the periodic ranging channel 334 for the carrier on which the mobile station performs the periodic uplink synchronization, by, e.g., changing a bandwidth, a periodic cycle, or a location of the periodic ranging channel 334.

In one exemplary embodiment, predetermined allocation patterns may be used for the periodic ranging channel 334, to reduce overhead of signaling negotiations. For example, referring to FIG. 3, a first allocation pattern is used for the primary carrier CH0, where the periodic ranging channel 334 is allocated to a first one of the four frames, i.e., the frame 312, in each of the super-frames 304 and 306. Also for example, a second allocation pattern and a third allocation pattern are used for the secondary carrier CH1, in which the periodic ranging channel 334 is allocated to a fourth one of the four frames, i.e., the frame 318, in the super-frame 304, and is allocated to each of the four frames in the super-frame 306. Further for example, the third allocation pattern and a fourth allocation pattern are used for the secondary carrier CH2, in which the periodic ranging channel 334 is allocated to each of the four frames in the super-frame 304, and is also allocated to each of the four frames in the super-frame 306 but with an increased bandwidth, represented by the increased height of the small block representing the periodic ranging channel 334.

As a result, for example, the mobile station may perform network entry on the primary carrier CH0 and achieve synchronization using the initial ranging channel 332, as described above. When the base station or the mobile station decides that the secondary carrier CH1 or CH2 is needed to serve the mobile station, the mobile station may perform adjustments by periodic ranging on the periodic ranging channel 334 without performing network re-entry.

In exemplary embodiments consistent with the present invention, a handover random access channel, e.g., a handover ranging channel (not shown), may be only allocated to the primary carriers, such as the primary carrier CH0. The mobile station performs a handover when it switches between different primary carriers, which may belong to the same base station or a different base station. The mobile station may perform a handover to a primary carrier by performing handover ranging on the handover ranging channel allocated to the primary carrier. In addition, locations of the handover ranging channel may be changed in the super-frames at a relatively low frequency. For example, a location of the handover ranging channel in a super-frame may be indicated by the BCH in that super-frame.

Figure 4:
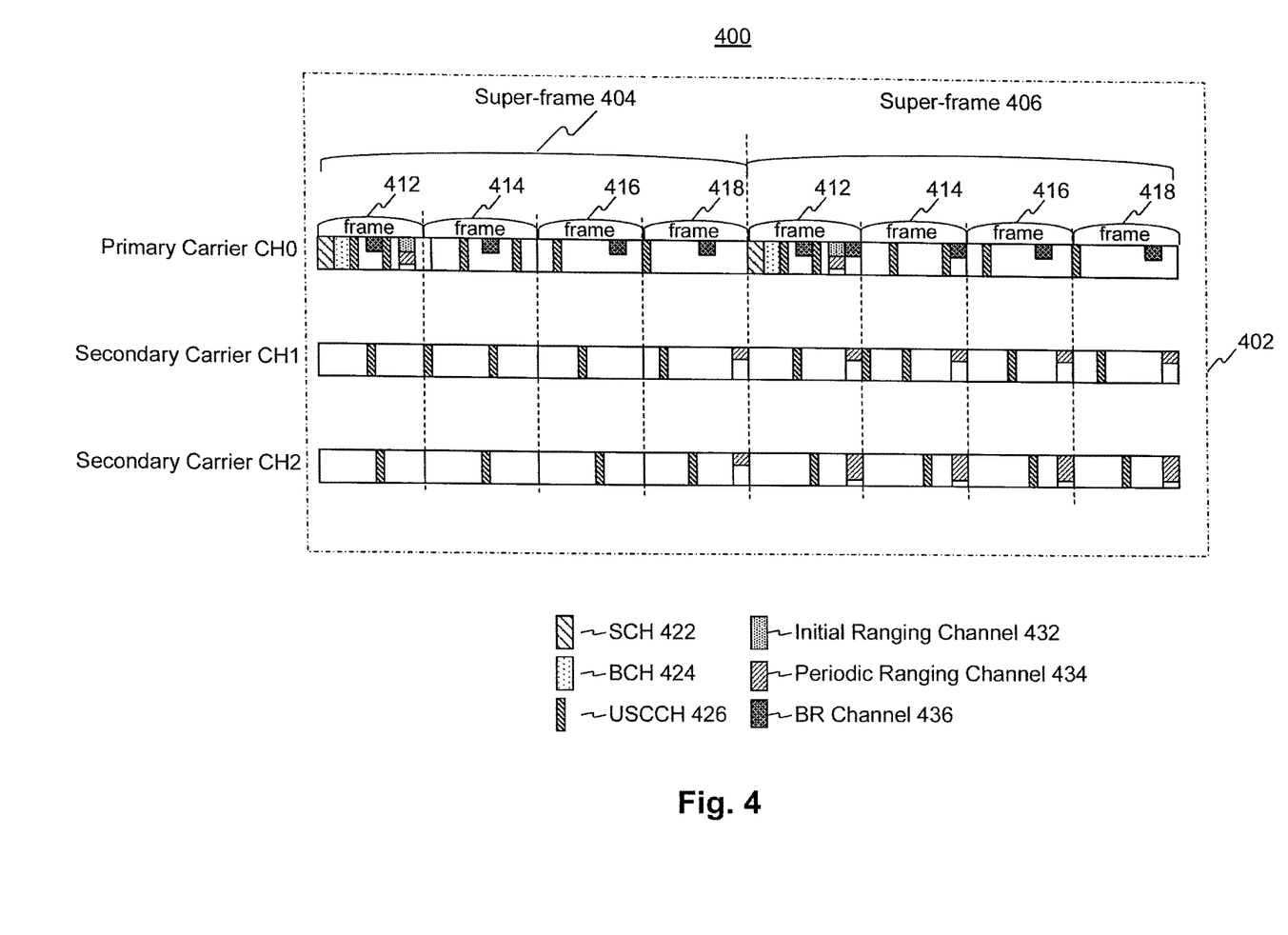
FIG. 4 illustrates an uplink control method for use in a multicarrier communication system, according to an exemplary embodiment.

FIG. 4 illustrates an uplink control method 400 for use in the above-described multicarrier communication system, according to an exemplary embodiment. For convenience of illustration, a frame structure 402 is shown for the primary carrier CH0, the first secondary carrier CH1, and the second secondary carrier CH2 of the multiple carriers. For example, the frame structure 402 may include a plurality of super-frames, such as first and second super-frames 404 and 406. Each of the plurality of super-frames may further include a plurality of frames. In the illustrated embodiment, the multicarrier communication system is an IEEE standard 802.16m based communication system. Accordingly, in the illustrated embodiment, each of the plurality of super-frames includes four frames 412, 414, 416, and 418. Each of the frames may further include a plurality of downlink and uplink sub-frames (not shown).

In addition, a synchronization control channel (SCH) 422, a broadcast control channel (BCH) 424, and an initial ranging channel 432 may be only allocated to the primary carriers such as the primary carrier CH0, and a unicast service control channel (USCCH) 426 and a periodic ranging channel 434 may be allocated to the primary and secondary carriers, such as the primary carrier CH0 and the secondary carriers CH1 and CH2, as described above.

In exemplary embodiments consistent with the present invention, a bandwidth request (BR) random access channel, e.g., a bandwidth request (BR) ranging channel 436, may be only allocated to the primary carriers such as the primary carrier CH0. When the mobile station needs bandwidth resources, the mobile station may send bandwidth request signaling to the base station on the bandwidth request ranging channel 436.

For example, the mobile station may simultaneously establish several communication connections on different carriers including ones of the primary and secondary carriers. If the bandwidth request ranging channel 436 were allocated to both primary and secondary carriers, it may cause resource overhead and, in addition, the base station may need to handle bandwidth requests from each one of the different carriers, which may increase complexity of the base station. Therefore, in exemplary embodiments consistent with the present invention, the bandwidth request ranging channel 436 may be only allocated to the primary carriers, and its location in the super-frames is dynamic and may be indicated by the USCCH 426.

In one exemplary embodiment, the mobile station may send a bandwidth request for one or more communication connections, including communication connections established on secondary carriers, on a primary carrier. For example, a bandwidth request for communication connections established on the primary carrier CH0 and the secondary carriers CH1 and CH2 may be sent on the primary carrier CH0. On the base station side, the base station may allocate uplink resources for a carrier or a combination of multiple carriers, while control information regarding the resource allocation may be transmitted on the primary carrier. In addition, the mobile station may send bandwidth request signaling using an aggregate request method or a separate request method, as described below.

Figure 5:
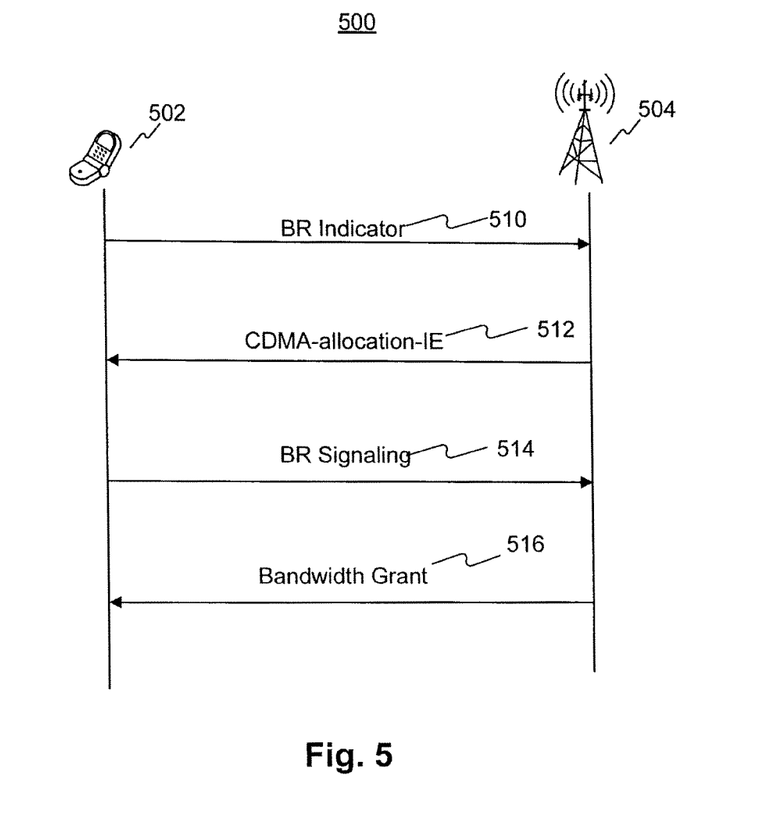
FIG. 5 illustrates an aggregate request method for a mobile station to request bandwidth allocation from a base station, according to an exemplary embodiment.

FIG. 5 illustrates an aggregate request method 500 for a mobile station 502 to request bandwidth allocation from a base station 504, according to an exemplary embodiment. For example, the mobile station 502 may have established a plurality of communication connections with the base station 504. If the communication connections correspond to a same quality of service (QoS) class, the mobile station 502 may group the communication connections together and calculate a total bandwidth required for the communication connections. The mobile station 502 may then send to the base station 504 an aggregate request for the total required bandwidth.

For example, the mobile station 502 may have first and second communication connections with the base station 504, the first and second communication connections corresponding to the same QoS class. If the mobile station 502 decides that the first communication connection needs a bandwidth of 10 kilobit per second (kbps) and the second communication connection needs a bandwidth of 20 kbps, the mobile station 502 may calculate a total bandwidth of 30 kbps required for the first and second communication connections. The mobile station 502 may then send to the base station 504 an aggregate request for the total bandwidth of 30 kbps.

Referring to FIG. 5, the mobile station 502 may send to the base station 504 a bandwidth request (BR) indicator 510, to indicate that the mobile station 502 needs bandwidth allocation for the plurality of communication connections. For example, the BR indicator 510 may be a code-division-multiple-access (CDMA) code. Upon receiving the BR indicator 510, the base station 504 may send to the mobile station 502 a CDMA allocation information element (CDMA-allocation-IE) 512, notifying the mobile station 502 that the BR indicator 510 has been received and where bandwidth resources have been allocated for the mobile station 502 to send BR signaling. The mobile station 502 may further send to the base station 504 BR signaling 514, which includes information regarding a group connection identification (CID) and the total bandwidth required for the communication connections. The BR signaling 514 may be a specific message or have a defined header format. In response to receiving the BR signaling 514, the base station 504 may grant bandwidth allocation for the communication connections (516).

Figure 6:
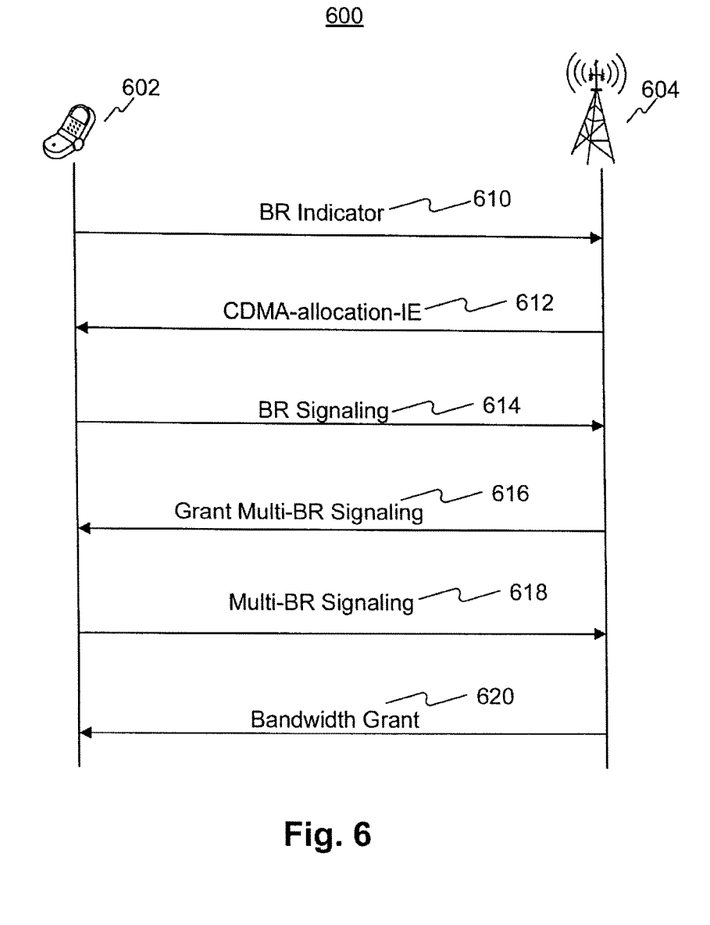
FIG. 6 illustrates a separate request method for a mobile station to request bandwidth allocation from a base station, according to an exemplary embodiment.

FIG. 6 illustrates a separate request method 600 for a mobile station 602 to request bandwidth allocation from a base station 604, according to an exemplary embodiment. For example, the mobile station 602 may have established a plurality of communication connections with the base station 604. If the communication connections correspond to different QoS classes, the mobile station 602 may group ones of the communication connections that correspond to a same QoS class together, to generate a plurality of groups of communication connections. The mobile station 602 may calculate a total bandwidth required for each of the groups of communication connections. The mobile station 602 may then send to the base station 604 separate requests each for one of the groups of communication connections.

Referring to FIG. 6, the mobile station 602 may send to the base station 604 a bandwidth request (BR) indicator 610, to indicate that the mobile station 602 needs bandwidth allocation for the plurality of communication connections. For example, the BR indicator 610 may be a code-division-multiple-access (CDMA) code. Upon receiving the BR indicator 610, the base station 604 may send to the mobile station 602 a CDMA allocation information element (CDMA-allocation-IE) 612, notifying the mobile station 602 that the BR indicator 610 has been received. The mobile station 602 may then send to the base station 604 BR signaling 614, which includes information regarding multiple-bandwidth-request (multi-BR) signaling for the groups of communication connections. The multi-BR signaling may be multiple specific messages or have defined header formats. In response to receiving the BR signaling 614, the base station 604 may send a grant message 616 to the mobile station 602, to indicate that the multi-BR signaling has been granted and where bandwidth resources have been allocated for the mobile station 602 to send multi-BR signaling. Accordingly, the mobile station 602 may further send multi-BR signaling 618 to the base station 604, the multi-BR signaling 618 including information regarding a group connection identification (CID) and a total bandwidth required for each of the groups of communication connections. In response to receiving the multi-BR signaling 618, the base station 604 may grant bandwidth allocation for the groups of communication connections (620).

Figure 7:
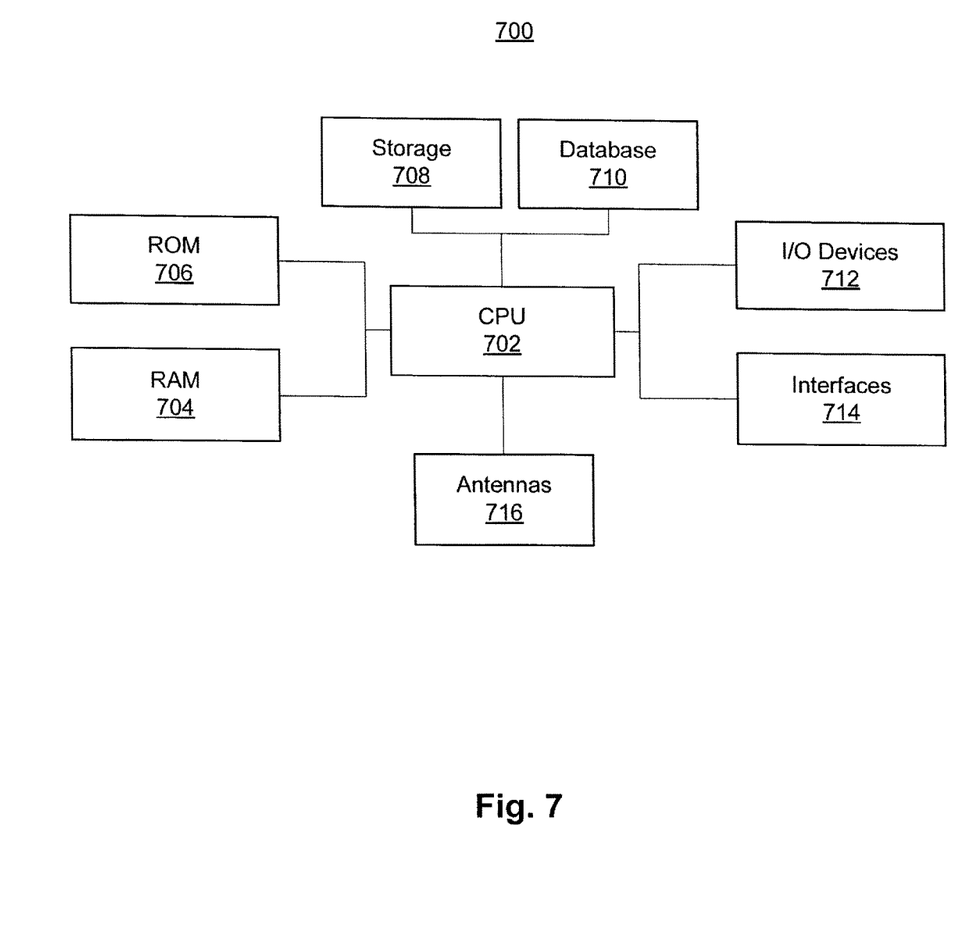
FIG. 7 illustrates a block diagram of an exemplary base station, according to an exemplary embodiment.

FIG. 7 illustrates a block diagram of an exemplary base station (BS) 700, according to an exemplary embodiment. For example, the base station 700 may be the base station noted above in any of FIGS. 2-6. Referring to FIG. 7, the base station 700 may include one or more of the following components: at least one central processing unit (CPU) 702 configured to execute computer program instructions to perform various processes and methods, random access memory (RAM) 704 and read only memory (ROM) 706 configured to access and store information and computer program instructions, storage 708 to store data and information, databases 710 to store tables, lists, or other data structures, I/O devices 712, interfaces 714, antennas 716, etc. Each of these components is well-known in the art and will not be discussed further.

Figure 8:
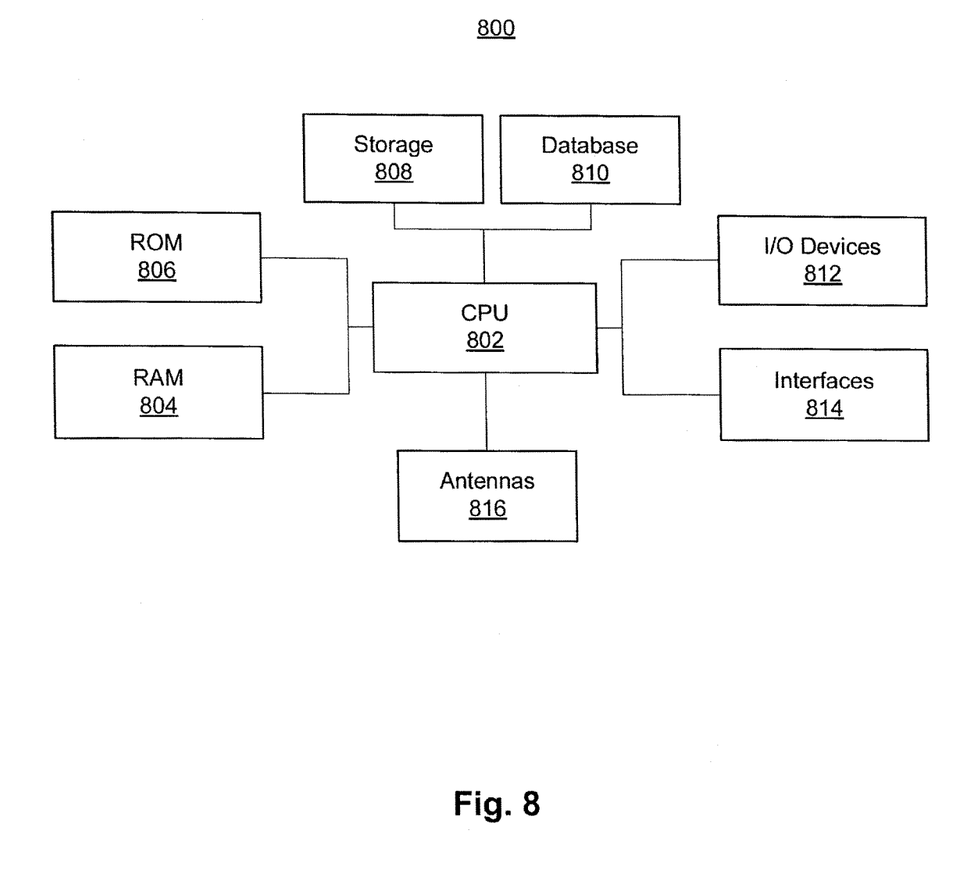
FIG. 8 illustrates a block diagram of an exemplary mobile station, according to an exemplary embodiment.

FIG. 8 illustrates a block diagram of an exemplary mobile station (MS) 800, according to an exemplary embodiment. For example, the mobile station 800 may be the mobile station noted above in any of FIGS. 2-6. Referring to FIG. 8, the mobile station 800 may include one or more of the following components: at least one central processing unit (CPU) 802 configured to execute computer program instructions to perform various processes and methods, random access memory (RAM) 804 and read only memory (ROM) 806 configured to access and store information and computer program instructions, storage 808 to store data and information, databases 810 to store tables, lists, or other data structures, I/O devices 812, interfaces 814, antennas 816, etc. Each of these components is well-known in the art and will not be discussed further.

Other embodiments of the invention will be apparent to those skilled in the art from consideration of the specification and practice of the invention disclosed here. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A bandwidth request method for use in a communication system including a base station and a mobile station, wherein the base station communicates with the mobile station using multiple carriers, the method comprising:
    determining, by the mobile station, for communication connections for which a bandwidth request is to be sent, a quality of service (QoS) of each of the communication connections; and
    sending, by the mobile station, the bandwidth request based on the determination to the base station,
    wherein when it is determined by the mobile station that the communication connections have different QoS classes, the method further comprises:
        separating, by the mobile station, the communication connections into a plurality of groups of communication connections, each of the groups having a same QoS class;
        calculating, by the mobile station, a total bandwidth required for each of the groups of communication connections, to thereby generate a plurality of calculated bandwidths;
        sending, by the mobile station, the bandwidth request wherein a group connection identifier is used; and
        sending, by the mobile station, separate requests as the bandwidth request when a random access to one of the multiple carriers is achieved, each of the separate requests for one of the plurality of calculated bandwidths.

2. The method of claim 1, wherein when it is determined that the communication connections have a same QoS class, the method further comprises:
    calculating, by the mobile station, a total bandwidth required for the communication connections; and
    sending, by the mobile station, an aggregate request as the bandwidth request for the total bandwidth.

3. A mobile station to communicate with a base station using multiple carriers, the mobile station comprises:
    a memory for storing instructions; and
    a processor for executing the instructions to:
    determine, for communication connections for which a bandwidth request is to be sent, a quality of service (QoS) of each of the communication connections; and
    send the bandwidth request based on the determination,
    wherein when it is determined that the communication connections have different QoS classes, the processor further executes the instructions to:
        separate the communication connections into a plurality of groups of communication connections, each of the groups having a same QoS class;
        calculate a total bandwidth required for each of the groups of communication connections, to thereby generate a plurality of calculated bandwidths;
        send the bandwidth request wherein a group connection identifier is used; and
        send separate requests as the bandwidth request when a random access to a carrier is achieved, each of the separate requests for one of the plurality of calculated bandwidths.

4. The mobile station of claim 3, wherein when it is determined that the communication connections have a same QoS class, the processor further executes the instructions to:
    calculate a total bandwidth required for the communication connections; and
    send an aggregate request as the bandwidth request for the total bandwidth.

* * * * *